(12) United States Patent
Harman

(10) Patent No.: US 6,658,430 B1
(45) Date of Patent: Dec. 2, 2003

(54) METHOD AND SYSTEM FOR REFORMATTING A TEXT FILE

(75) Inventor: James L. Harman, Southport, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/471,764

(22) Filed: Dec. 23, 1999

(51) Int. Cl.$^7$ ................................................ G06F 7/00
(52) U.S. Cl. .................. 707/104.1; 707/103 R
(58) Field of Search ................. 705/401–411; 717/104.1–109, 2, 4; 358/1.11; 235/375, 378, 454, 494; 707/103, 530, 531, 104.1

(56) References Cited

U.S. PATENT DOCUMENTS

| | | | | |
|---|---|---|---|---|
| 5,353,388 A | | 10/1994 | Motoyama | 395/117 |
| 5,420,403 A | * | 5/1995 | Allum et al. | 235/375 |
| 5,450,545 A | * | 9/1995 | Martin et al. | 717/109 |
| 5,483,653 A | | 1/1996 | Furman | 395/650 |
| 5,960,164 A | * | 9/1999 | Dorfman et al. | 358/1.11 |
| 6,253,219 B1 | * | 6/2001 | Gardner et al. | 707/503 |
| 6,282,524 B1 | * | 8/2001 | Kramer | 705/408 |

OTHER PUBLICATIONS

Sep. 1997, Hands–On Streamweaver® Learning Guide Release 4.0, pp. i–1.18.
Jul. 1997, Streamweafer® Language reference Release 4.0, pp. i–1.22.

* cited by examiner

*Primary Examiner*—Safet Metjahic
*Assistant Examiner*—Te Y Chen
(74) *Attorney, Agent, or Firm*—George M. Macdonald; Angelo N. Chaclas; Charles R. Malandra

(57) ABSTRACT

A method and system for reformatting an ASCII or similar text file is provided, such that the resulting output can be easily manipulated, enhanced and postal coded. Text reformatting of the present invention uses easily defined set up data tables to read the input text file and then to direct extraction of information from the input text file for storage in a set of data base tables. Included in this information may be destination addresses, which can be optionally exported to address quality software for postal coding and presorting. The address data is then re-imported and a report is created using a standard report generator. The report may then be sent to a document finishing program for processing into a mail stream.

16 Claims, 5 Drawing Sheets

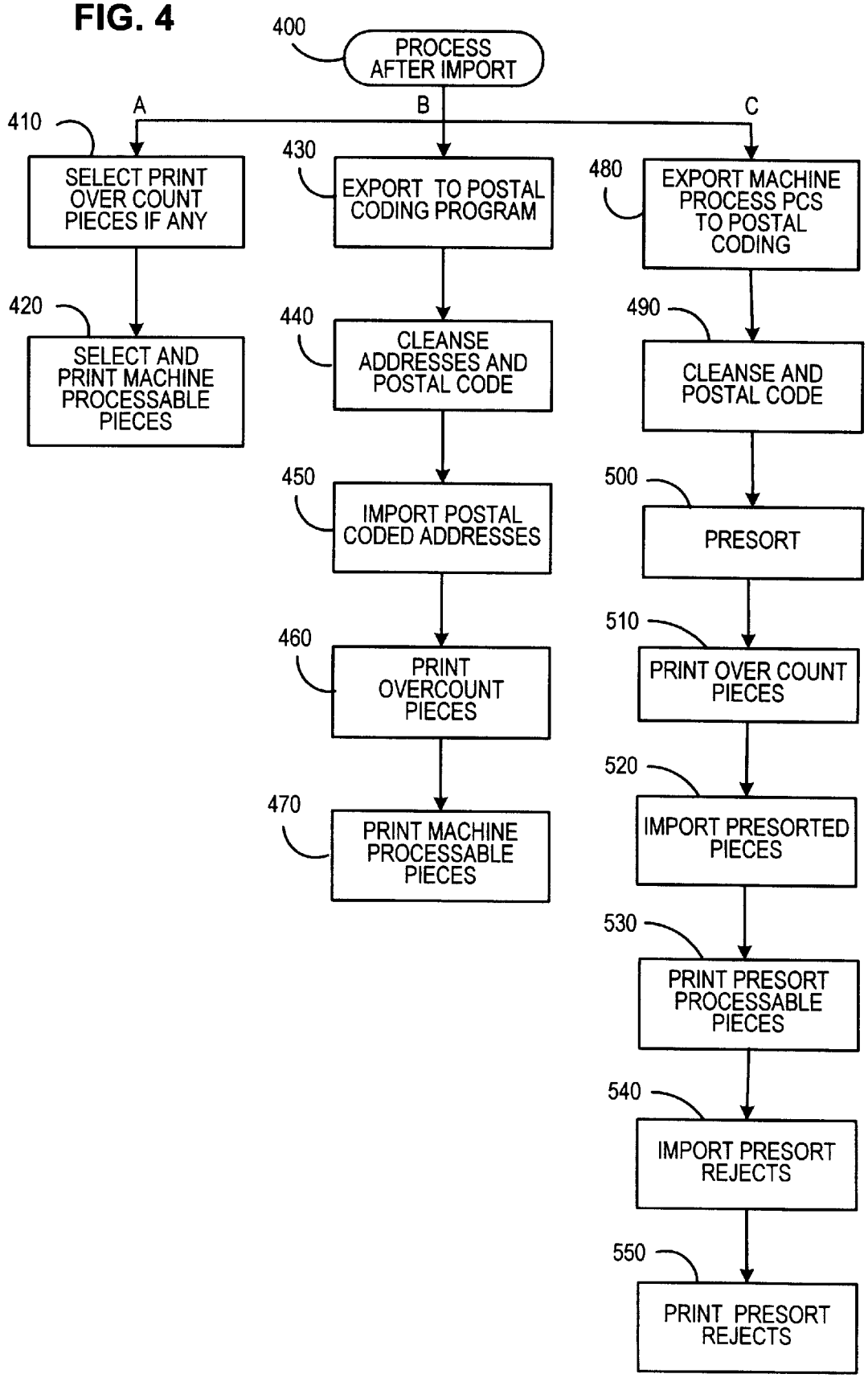

US 6,658,430 B1

METHOD AND SYSTEM FOR REFORMATTING A TEXT FILE

FIELD OF THE INVENTION

The present invention relates generally to the field of text file reformatting, specifically reformatting a text file for use within a data processing system. More particularly, this invention relates to reformatting an ASCII print file or similar text file by providing easily defined set up parameter tables to control the process of importing the information contained in the ASCII or similar text file for use in software programs.

BACKGROUND OF THE INVENTION

Typical data processing systems often produce, an ASCII or similar text file as output. Such data processing systems generate documents for use in a variety of commercial activities. For example, such documents include purchase and sale invoices, medical bills, activity accounting, and performance reports. It is often required that these documents, once generated, be transmitted through the postal system.

Typically, these data processing systems require generation of a text file, and then send the file to a printer for printing that merely replicates the exact layout of the text file. The result is a stack of paper printouts that cannot be altered or manipulated unless the user changes the program and/or data that produced the original text file and again reprints the file. Furthermore, these files do not include font or graphics information, thus, if a user wishes to print a logo or other graphics information, preprinted forms must be employed.

One example of such document production systems is those systems used for billing and reporting in medical offices. When a patient visits the doctor, a report is generated, typically by an employee, who enters information into an accounting program. The information usually includes the patient's name, billing address, the specific services performed, the cost of the services and the date of the visit. If the same patient visits the same doctor, another document is created representing the second visit. The bills are then sent to a simple printer for printing on a preprinted form, which may include the doctor's name and return address, and any desired graphic information. If the bill contains many entries for service performed, it may be required to be printed on several pages. If the bill is over a certain page limit, automated finishing equipment may not be able to handle it properly.

Another problem with these systems occurs when multiple reports are generated during a single report cycle. For example, if a patient visits the doctor several times within the same billing period, he/she is sent multiple bills, unless an employee manually checks for duplicate addresses. This practice is costly, as the user must either pay for the employee's time or the double postage. Moreover, patients are often annoyed and the doctor is embarrassed when multiple bills are received. Furthermore, if the doctor wishes to alter the design of the document or any text contained thereon, the change must be made in the original program. If the change is a uniform change to be made on each document, then every document must be reprinted. These changes are time consuming and costly. It is to be appreciated that prior art systems are not capable of handling changes to document size or any other format or print style change is to the document. In these prior art systems, the user can only make changes to the document by rewriting the entire file and the program, which directs the final report.

Another disadvantage with these text file systems is that the text files, which in turn require mail delivery, cannot easily or automatically take advantage of address quality programs and/or document finishing systems, such as FINALIST®, SMARTMAILER® and/or DocuMatch™, manufactured and distributed by Pitney Bowes Inc., of Stamford, Conn. These programs provide postal discount qualifications and prepare mail for delivery into the postal stream, respectively.

BRIEF SUMMARY OF THE INVENTION

According to the present invention, a method and system for reformatting an ASCII or similar text file is provided, such that resulting data may be easily manipulated, enhanced and/or postal coded. The text reformatting software of the present invention uses easily defined data tables to control the reading of the text file and to direct extraction of information from the input text file for storage in a set of data base tables. Included in this information may be destination addresses, which can be optionally exported to address quality software for postal coding and presorting. The address data is then re-imported a report is created using a standard report generator, such as Microsoft ACCESS™. The report may then be sent to a document finishing system for processing into a mail steam.

Setting up the import process is easily accomplished by storing set up parameters in data base tables, which are easily defined and maintained. Typical text files include three types of data. The first type of data is document header information, often printed in the top section of each page. For example, header information includes the name and address of the user for which the documents are being generated. The second type of information that is typically found within the text file is variable information. Variable information includes line items, such as data, which may represent a service performed by an office, or an item bought at a store. The third type of data is footer information, such as totals often found only on the last page of a document.

The parameter set up tables of the present invention define the layout of the input file. These set up parameters are stored in data base tables and are used to control where from the input file to retrieve information, as well as to control the import process. For example, the set up parameters can be instructed that the first five lines of the document include header information and the next 20 lines include variable information, as well as the end point of the pass. For security purposes, the user may restrict access to the set up parameters. Several levels of access can be provided for the overall system. The most limited access is the User Level; at this level the user is enabled only to run and print the program. The next level of access is the Key Operator; this level of access allows the user to operate as a regular user, and to have the ability to change the layout of the reports. The Key Operator may also have limited set up access, such as manipulation of the name of the file and maximum number of pages. The next level of access may be the Set Up; this level can access the set up parameter definitions. Finally, the Developer has access to change the underlying code of the reformatting program. It is not necessary that access be defined as above, however, it is to be appreciated that levels of security may be provided to the system.

Once the input file layout and setup parameters have been defined, the import process is run and a set of data tables is created as defined by the set up parameters. These data tables, for example, include common information, line items, and destination addresses. The set up parameters instruct the program to extract the appropriate information from the input file and store the data in the proper data table.

The destination address file contains any information related to the destination of the document such as, the recipient's name and address. The information contained within the destination address may be then exported, such that an address quality program may be applied. Address quality programs include programs such as FINALIST® or SMART MAILER® manufactured and distributed by Pitney Bowes Inc.™, of Stamford, Conn. These products enable address cleansing, and postal coding and presorting, which result in potential qualification for postal discounts. Known address cleansing systems such as FINALIST® or SMART MAILER® compare a list of initial address against criteria and/or databases to determine if a more appropriate address should be substituted or the address removed. The address cleansing system may provide for format changes to reflect postal system preferences or enhancements such as zip+4. The system may provide for address accuracy, moved addresses and duplicates. Once complete the data is imported back into the destination address data table.

These data tables are linked such that after the information is manipulated, the documents created by a report generator contain the appropriate and related information. For example, during the import process, each document in the input file is assigned a document number and an address number. The document number provides a link between both the line items and the common information, while the address number links the common information and the destination address. Therefore, when the stored information is accessed during report generation, the links ensure that the report contains related information. If, during import, the program observes that an identical address is being imported, it assigns the document the same address number, however, each document is assigned a different document number. During presort, the documents are placed in print order proximity such that, during report generation, the documents having the same address are printed sequentially so that they can be placed in the same envelope.

The user must then generate a report representative of the desired print output. Such report generation may be accomplished using Microsoft Access® or a similar report generator. Any changes a user desires to make to a report may now be easily made at the report generation step; the user is no longer required to return to the program that produced the text file to make final report layout changes.

If a document does not have too many pages, it may then be sent directly to a printer, saved for later use or transmitted electronically. The reports may be processed by a mail piece finishing system, such as DocuMatch™, manufactured by Pitney Bowes Inc., located in Stamford, Conn. These mail piece finishing systems properly address and bar-code mail pieces, as well as enable preprinted sheets or inserts to be added to the envelope of a mail piece.

Other objects, features, and advantages of the invention will become apparent from the following description of specific embodiments when read in conjunction with the accompanying drawings.

BRIEF DESCRIPTION OF THE DRAWINGS

FIG. 4 is a flow chart of the post import process of the present invention.

DETAILED DESCRIPTION OF THE PREFERRED EMBODIMENT

Figure 1:
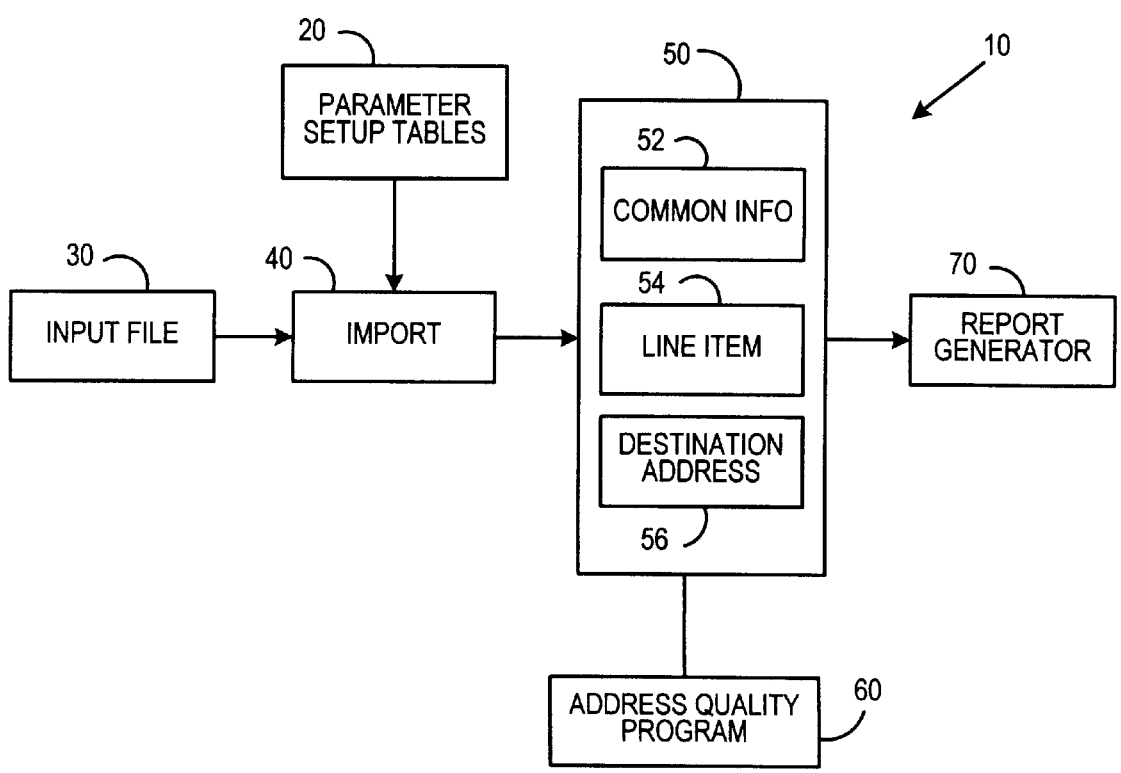
FIG. 1 is a block diagram of the reformatting system of the present invention.

Referring now in detail to the drawings, and more particularly to FIG. 1, is shown a block diagram of the text file reformatting system of the present invention. System 10 includes parameter setup tables 20, which are created by the user such that the setup parameters define input file 30 and control import process 40. Input file 30 may be an ASCII or similar text file. Typical text files may exist or they may be specifically created for this application. Such files may be existing for a wide variety of applications, such as for the generation of medical bills, purchase and sale documents or textual reports. Parameter set up tables 20 define the layout of input file 30, including, for example, the location of the header, line item and page information. The user must define the setup parameters only once for each text reformatting application. Once the layout of input file 30 has been defined, changes to the setup parameters can be easily made. Parameter setup tables 20 further include control parameters for identifying where the defined information is to be directed during import 40.

As import process 40 runs, setup parameters 20 direct what information is extracted from input file 30 and where the information is to be placed within data tables 50. Data tables 50 include common information 52, line item information 54 and destination address information 56. Common information 52 includes header and footer information for each document in the input. For example, common information 52 may include a customer number, billing date, the return address of the user and any other header information. Line item information 54 includes, for example, variable information such as, each services performed by a doctor during a visit, or each item purchased from a store, as well as the respective billable amount for each service or item. Destination address information 56 includes the destination of each document in input file 30.

Related fields provide links between data tables 50. Common information 52 stores a document number and address number for each document in the input file. If, during the import process, the program identifies a second document as having the same address as an address on an input document that has already assigned an address number, that second document is assigned the same address number but it is given a new document number. The address number links destination address 56 with common information 52, while document number links line item information 54 with common information 52. Destination address table 56 may be operatively connected to address quality program 60. The information contained in destination address table 56 may then be exported to address quality program 60 for performing postal presorting, and address cleansing. Once address quality program 60 has been completed, the results are then re-imported into destination address table 50 for use during report generation 70.

Figure 2:
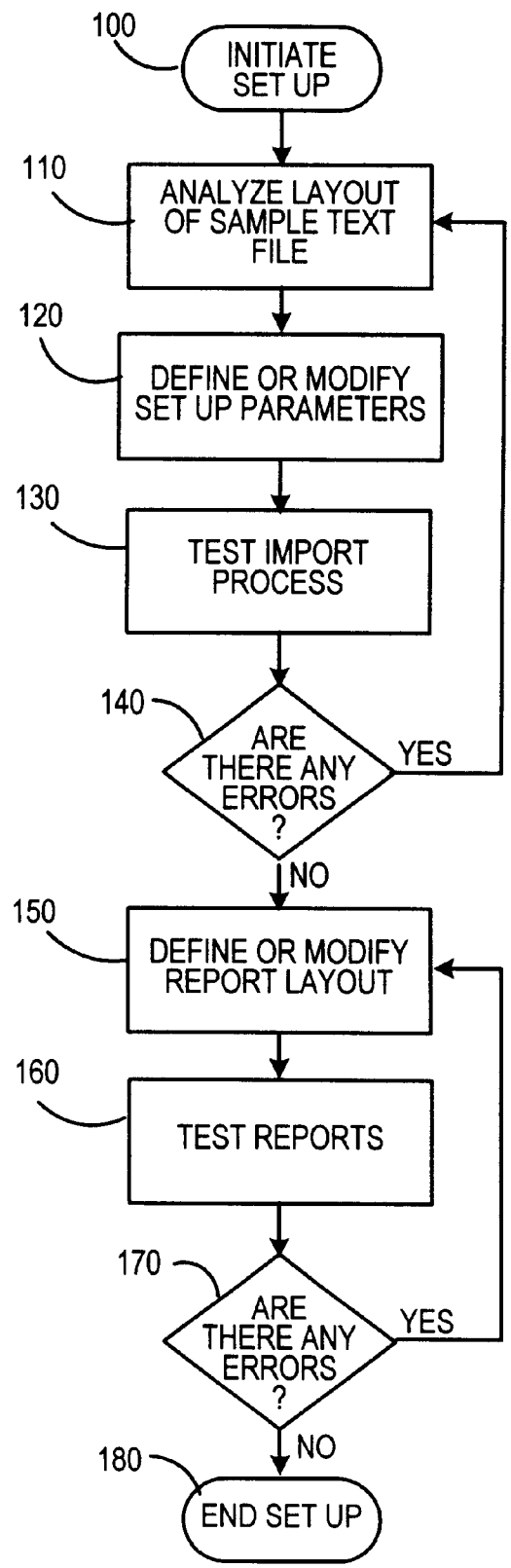
FIG. 2 is a flow chart describing the set up process of the present invention.

Now turning to FIG. 2 is shown a flow chart describing the set up process of the present invention. The process is initiated at step 100 and continues to step 110 where a sample file is analyzed. During set up, through the use of interactive forms, the user defines the overall layout of the text file including, the line number, starting column, width, and type of each field to extract from the text file. This requires the user to identify in detail where on the text file certain items are located, but as will be seen, the user does not need to write a special program to control the importing process.

The process then continues to step 120 where the set up parameters are defined. The parameter definition file identification can be described in several sections. The first section is the File Items Section. This section may include an Input file name, which is the full path and name of the input file, and a Job file, which is the full path and file name for the Job file used to control mail finishing equipment. A second file identification section may be the Input File Layout Section. This section includes the Lines Per Page field, which is the maximum number of lines per page in the input file. The File Format field is the type of file, such as, for example, UNIX or DOS. The Skip Pages field specifies a number of pages to skip at the beginning of the file, while the Skip Lines field specifies a number of lines to skip at the beginning of the file after skipping pages. Skip Character field specifies a number of characters to skip, after skipping pages and lines at the start of the file. This allows the user to skip print setup strings, which may occur at the beginning of the file. The Line Items Style field specifies the layout of the line items section of the input file and the Line Items Start field specifies the starting line number of the line items. The Maximum Line Items field is the maximum number of lines items on a page in the input file, while the Lines Per Line Item field is the number of lines for each item, including any blank lines separating the line items. The Total indicator field defines a text string that marks the beginning of the footer information. Line Item End field specifies the ending location of the line items relative to the Total indicator; this is used to stop line item processing above floating totals on the last page. Last Page Indicator Position identifies a text string that marks the last page. This may also be a fixed or floating position. Line Items Per Printed Page field allows the system to compute during input how many pages will be printed for each document.

Another section to be entered in the setup parameters is information about fields that are used to control the importing process. The Total and Grouping field includes the line number, starting position, and width for a numeric field used for combining items in one envelope. If a duplicate value in this field is detected during import, documents that should be sent to the same address can be grouped together. The Last Page Indicator is a text string that marks the last page of a document in the input file, while the Total Indicator is a text string that locates the totals section on the last page of the document. The Total indicator may be set to be a fixed position or a floating position. If the Total Indicator is fixed, then the given line number indicates the beginning of the total section and the rest of the information is ignored. If the total indicator is set to float, then the line number is ignored and the page is searched from the start of the line items down to find the given text.

Yet another section defined in the parameter setup is The First Page section. This defines the fields, which are to be extracted from the first page. The Field Name defines the name the user wishes to assign the field and the Line Number indicates the line number on the page where the item appears. The Starting column defines the column number of the first character of the field. The Width communicates the width of the data items in the columns. Type specifies the data type for the field, such as text, date, integer, single, double, currency or Boolean.

Other parameters table sections include the Destination address section, the Last Page section and the Line Items section. The Destination Address fields define the destination address lines that may be run through an address quality program. An example of an address quality program that may be applied is FINALIST® or SMART MAILER®, a product of Pitney Bowes Inc. of Stamford Conn., which verifies, standardizes and corrects address elements and appends postal codes. Such programs prepare mailing addresses for automated handling through the USPS, allowing mailers to qualify for postal discounts, as well as to reduce costs due to delayed delivery and undeliverable-as-addressed mail. Another section, The Last Page section, contains fields extracted from the last page, while the line items section defines fields to be extracted from the line items section of the input file.

During normal operation, the set up process is performed once. Then, each time the program is run, it can proceed to FIG. 3A, where the import program is run. After the set up is completed at step 120 of FIG. 2, the method then proceeds to step 30 where the import process is tested. The method proceeds to step 140 where it is determined as to whether or not any errors occurred during the test import. If an error did occur, then the method returns to step 120 where the set up parameters can be modified. This process continues until at step 140 it is determined that there are no errors. If there are no errors, then the method proceeds to step 150 where the final report layout is defined. The method then continues to step 160 where the reports are tested. The method then proceeds to step 170 where the process queries as to whether or not any errors occurred during the test reports process. If an error did occur during the test step, then the method returns to step 150 where the report layout is again defined. This process continues until at step 170, where it is determined that no errors occur during test reports. If, at step 170, it is determined that no error occurs during test reports, then the method continues to step 180 where the set up process is complete.

Figure 3A:
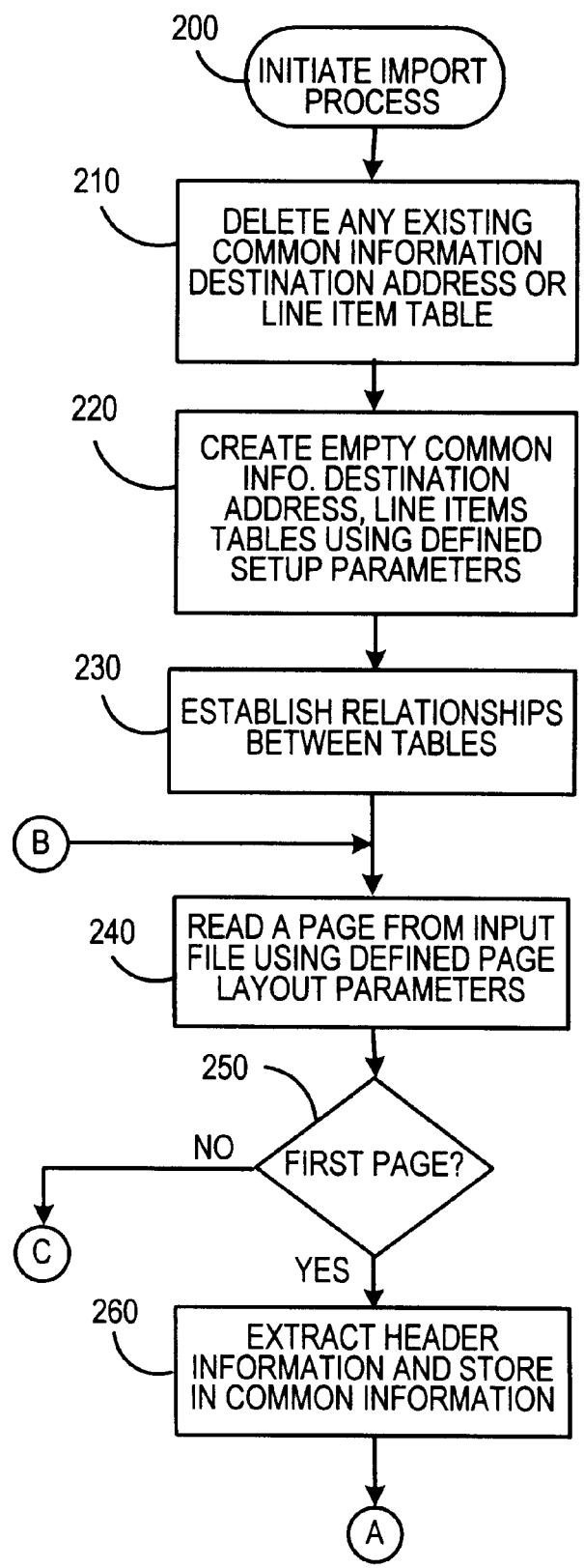
FIG. 3A is a flow chart of the import process of the present invention.

Now turning to FIG. 3A is shown the import process of the present invention. The import process is initiated at step 200. Once initiated, this process can proceed automatically with no user interaction required The method continues to step 210 where any existing common information, destination address or line item information tables are deleted. The method then progresses to step 220 where empty common information, destination addresses, and line items tables are created, using defined setup parameters.

The Common information table holds document header and footer information and has one record per document. For example, common information includes the name and address of the user, and any header information. The Line Item table holds includes, for example, variable information, such as each service performed during a doctor's visit, items purchased from a store and the billable amount for each service or item. The Line Item table has one record for each line item entry. Destination address information includes the address for the destination of each document and maintains one record for each address. For example, there may be several documents having the same address, however, the destination address table maintains only one record of the address.

The method then progresses to step 230 where a relationships are is established between the tables. The data tables are linked by related fields, such as a document number and an address number for each document in the input file. During import, an address number and a document number are assigned to each document. If a second document is identified as having a duplicate address, that document is assigned the same address number but a new document number is always assigned. The address number links the destination address with common information while document number links line item information with common information.

The method continues to step 240 where a page from an input file is read using defined page layout parameters. The method then continues to step 250 where the method queries as to whether or not the page that was read is the first page of a document. If the answer to the query is "yes," then the method continues to step 260 where the header information is extracted from the first page and is stored in the common information. The method then proceeds to connector A. If, however, the answer to the query is no, then the method proceeds to step 290 located on FIG. 3B through connector C.

Figure 3B:
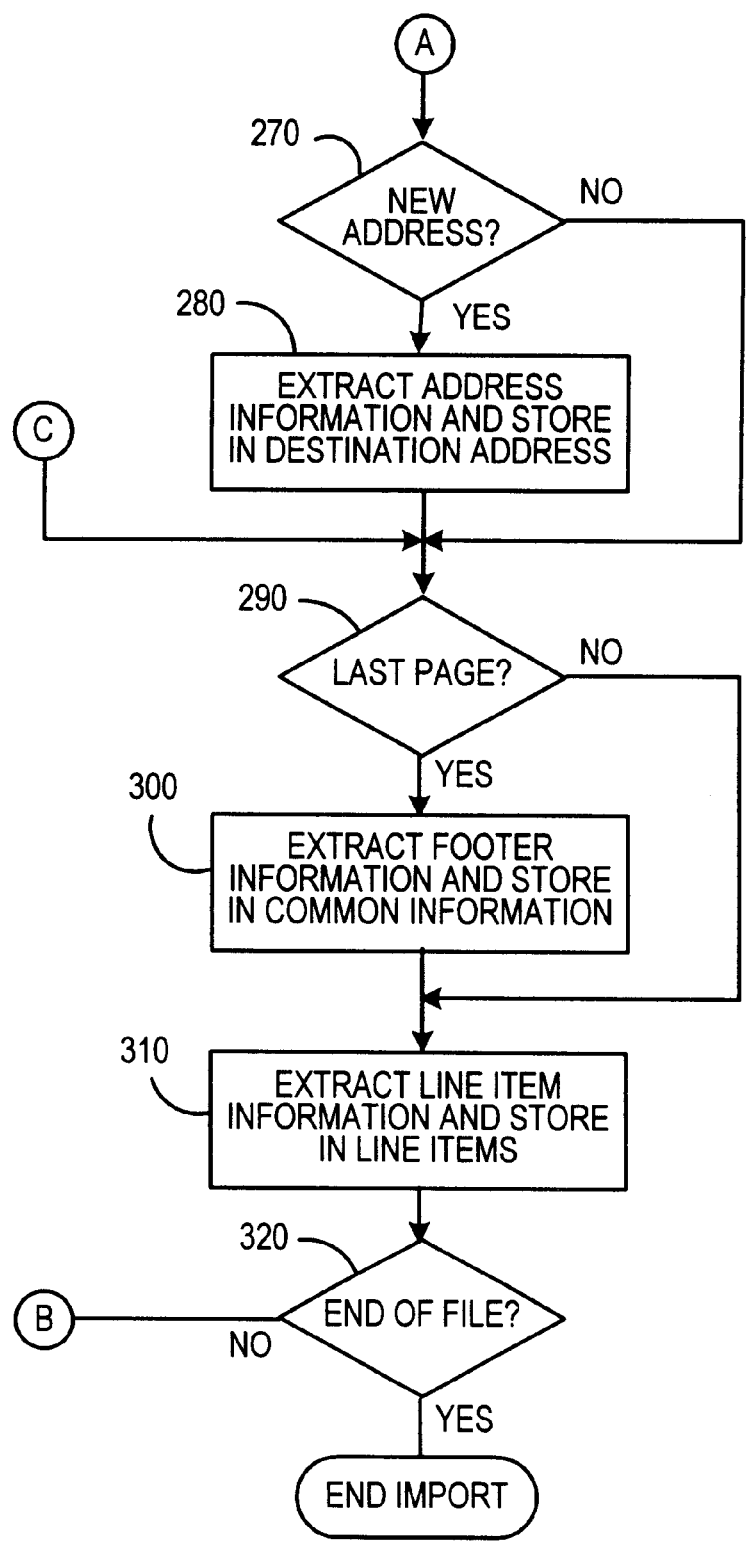
FIG. 3B is continuation of the flow chart of FIG. 3A.

Now turning to FIG. 3B the method continues at connector A and proceeds to step 270 where the method queries as to whether or not the document contains a new address. If the answer to the query is "no," then the method proceeds to step 290. If, however, the answer to the query is "yes," then the method continues to step 280 where address information is extracted and stored in the destination address table. The method then continues to step 290 where the method queries if the page is the last page. If the answer to the query is "no," then the method continues to step 310. If, however, the answer to the query at step 290 is "yes," then the method continues to step 300 where footer information is extracted and stored in common information table. The method then continues to step 310 where line item information is extracted and stored in the line item table. The method then continues to step 320 where the method queries as to whether or not the end of the input file has been reached. If the answer to the query is "yes," then the import process ends at step 330. If, however, the answer to the query is "no," then the method proceeds to connector B. Connector B returns to FIG. 3A and continues to step 240. This process continues until at step 320 the end of the input file has been reached.

Now turning to FIG. 4 is shown beginning at step 400 the possible processes after import has occurred. Proceeding down path A to step 410 where the user selects to print any over count documents that exist. Over count occurs when a document formatted by the report generator contains too many pages for the designated document finishing system to process. The method then continues to step 420 where the machine processable documents are selected and printed. Alternatively, the M/2 method may proceed down path B to step 430 where the import process result is sent to a postal coding program. Postal coding programs are known, therefore a detailed description of a postal coding program is not necessary for an understanding of this invention. The method continues to step 440 where the addresses are cleansed and postal coding occurs. The method proceeds to step 450 where the process imports to the destination address table the postal coded addresses.

The method continues to step 460 where the over count documents are printed. The method continues to step 470 where the machine processable document are printed. In another alternative, the method continues down path C where the machine process documents are exported to a postal coding program. The method continues to step 490 where the addresses are cleansed and postal coded. The method continues to step 500 where a presort program is run. The method proceeds to step 510 the over count pieces are printed. The method then continues to step 520 where the presorted addresses are imported to the destination address table. The method then continues to step 530 where the processed presort documents are printed. The method then continues to step 540 where the addresses that were not processed during presort are imported to the destination address table. The method continues to step 550 where the unprocessed presort documents are printed.

The above specification describes a new and improved system and method for automatically transferring information in a data processing system. It is realized that the above description may indicate to those skilled in the art additional ways in which the principles of this invention may be used without departing from the spirit of the invention. It is, therefore, intended that this invention be limited only by the scope of the appended claims.

What is claimed is:

1. A method for reformatting a program file comprising the steps of:

selecting a file;

defining a layout of said file;

creating one or more set up tables defining said layout of said file;

defining said set of data tables, said set of data tables including, common information, line item information and designation address information;

running an import process to store said defined information into said data tables, generating a report based upon said stored data table information;

transmitting said report;

exporting said destination address information to a postal coding program;

performing address cleansing and postal coding to said exported destination address information;

importing said postal coded destination addresses to said destination address table;

determining if said file is over count or if said file is machine processable;

printing said over count file; and printing said machine processable file.

2. The method as claimed in claim 1, wherein said document is a text file.

3. The method as claimed in claim 1, wherein said common information table includes file header and footer information for said file.

4. The method as claimed in claim 1, wherein said line item information table includes variable information contained in said file.

5. The method as claimed in claim 1, wherein said destination address information table includes the destination location of said file.

6. A method for reformatting a program file comprising the steps of:

selecting a file;

defining a layout of said file;

creating one or more set up tables defining said layout of said file;

defining said set of data tables, said set of data tables including, common information, line item information and designation address information;

running an import process to store said defined information into said data tables;

performing address cleansing on said destination address information;

generating a report based upon said stored data table information; and transmitting said report, wherein said information within said data tables is related by a first document number and a first address number.

7. The method as claimed in claim 6, further comprising the step of:
   identifying whether a second document contains the first address;
   if said document does not contain said first address, then assigning said second document a second document number and a second address number; or
   if said document does contain said first address, then assigning said second document a second document number and said first address number.

8. A system for reformatting a program file, said system including:
   a program file;
   set up parameters created for defining a layout of said program file and for controlling an import process;
   a set of data tables for storing information, said set of data tables including, common information, line item information and designation address information;
   said import process wherein said set up parameters direct said file information to said defined data tables; and
   a report generated based upon said information stored in said data tables,
   wherein said data tables include common information, line item information and designation address information;
   wherein said destination address information is processed by an address cleansing system; and
   wherein said tables are related by a first document number and a first address number.

9. The system as claimed in claim 8 wherein said import process further includes
   identifying whether a second document contains said first address;
   if said document does not contain said first address, then assigning said second document a second document number and a second address number; or
   if said document does contain said first address, then assigning said second document a second document number and said first address number.

10. The system as claimed in claim 8, wherein said common information table includes file header and footer information for said file.

11. The system as claimed in claim 8, wherein said line item information table includes variable information contained in said file.

12. The system as claimed in claim 8, wherein said destination address information table includes the destination location of said file.

13. The system as claimed in claim 8, wherein said report generator determines if said file is over count or if said file is machine processable.

14. The system as claimed in claim 13, wherein said over count file is printed.

15. The system as claimed in claim 14, wherein said machine processable file is printed.

16. The system as claimed in claim 8, wherein said report is sent to a document finishing system.

\* \* \* \* \*